United States Patent [19]

Dunn

[11] Patent Number: 4,646,580
[45] Date of Patent: Mar. 3, 1987

[54] MOTION CONVERTOR FROM ROTARY TO SINE-WAVE RECIPROCATION

[75] Inventor: Aubrey J. Dunn, Springfield, Va.

[73] Assignee: The United States of America as represented by the Secretary of the Army, Washington, D.C.

[21] Appl. No.: 783,701

[22] Filed: Oct. 3, 1985

[51] Int. Cl.⁴ ............................................. F16H 21/22
[52] U.S. Cl. ............................................. 74/44; 92/73
[58] Field of Search ............................... 74/44; 92/73

[56] References Cited

U.S. PATENT DOCUMENTS

| 427,171 | 5/1890 | Grafton | 74/44 X |
|---|---|---|---|
| 679,235 | 7/1901 | Patten | 74/44 X |
| 679,344 | 7/1901 | Singer | 74/44 X |
| 2,165,791 | 7/1939 | Farrell | 74/44 |
| 2,687,649 | 8/1954 | Seragnoli | 74/44 |
| 3,401,568 | 9/1968 | Blatt | 74/52 |
| 3,406,508 | 10/1968 | Fridley | 74/52 X |
| 4,411,164 | 10/1983 | Durenec et al. | 74/55 |

FOREIGN PATENT DOCUMENTS

| 1124085 | 6/1956 | France | 74/44 |
|---|---|---|---|
| 1586081 | 3/1981 | United Kingdom | 74/44 |

*Primary Examiner*—Thomas F. Callaghan
*Attorney, Agent, or Firm*—Max L. Harwell; Aubrey J. Dunn; Anthony T. Lane

[57] ABSTRACT

A crankshaft with a crank arm is connected to a reciprocatable piston or crosshead by a connecting rod. By having the connecting rod length equal to the crank arm length, a motion whose equation is $y = 2a \sin \alpha$ is imparted to the piston or crosshead. In the equation y is the linear position of the piston or crosshead, a is either the crank arm or connecting rod length, and $\alpha$ is constant angular rotation of the crankshaft.

2 Claims, 1 Drawing Figure

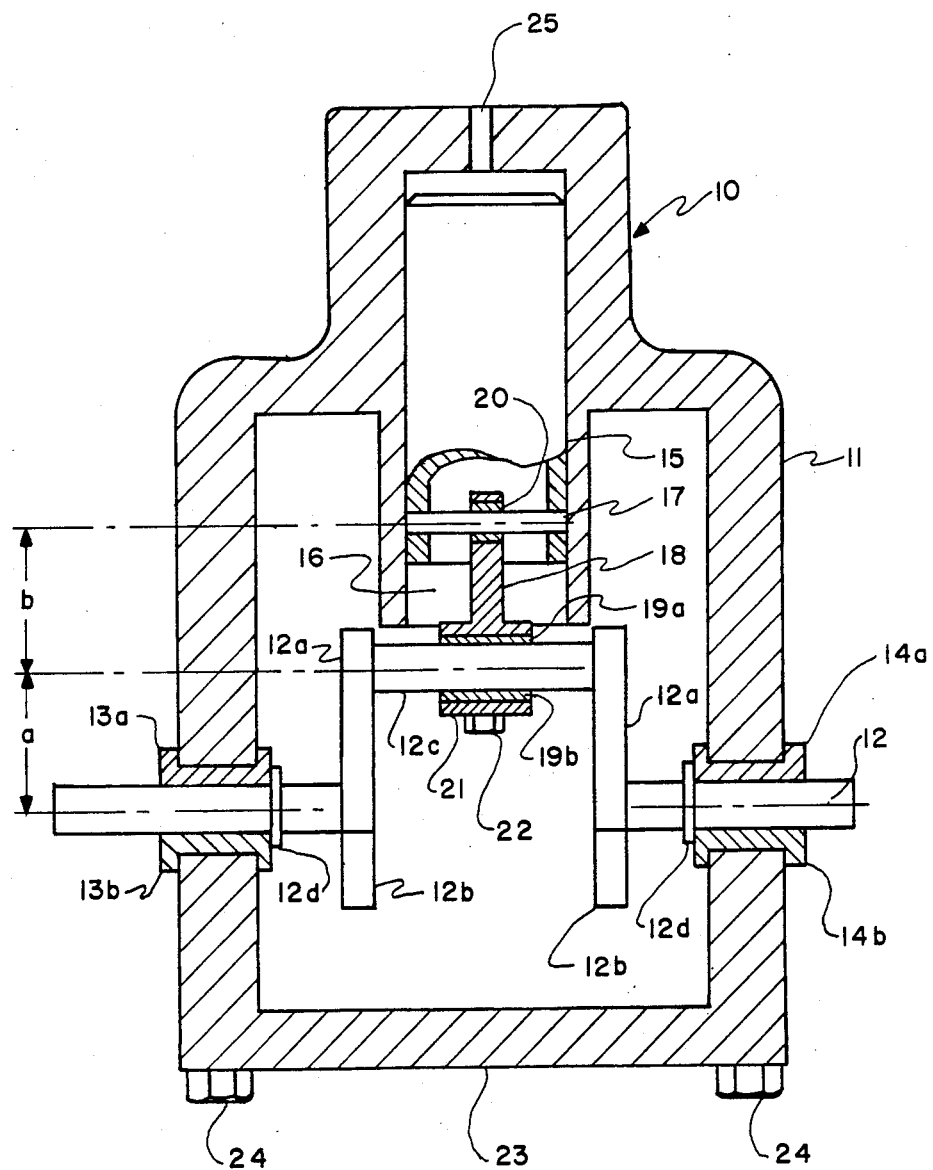

MOTION CONVERTOR FROM ROTARY TO SINE-WAVE RECIPROCATION

The invention described herein may be manufactured, used, and licensed by the U.S. Government for governmental purposes without the payment of any royalites thereon.

BACKGROUND OF THE INVENTION

This invention is in the field of devices for converting rotary motion to linear motion, and vice versa. Many such devices are well known in the art, some of them centuries old. The treadle is good example of such a device. The beginning of mechanization of labor brought forth many such devices, but the more common ones arose with the invention of the steam engine. Probably the best known and most widely used such device is the crank and lever connection between a reciprocating piston and a rotating shaft. Another well known device is the Scotch yoke.

In the cryogenic compressor art, there is a need for compressors which give a sine wave of pressure in a line. Unfortunately, a conventional reciprocating piston compressor, except for the special case of the instant invention, does not move with a sine wave motion, or provide a sine wave of pressure. In order to achieve such a motion or pressure wave, other means are resorted to, such as the invention shown in U.S. Pat. No. 4,411,164 of Oct. 25, 1983, of which I was a joint inventor. This patent uses a circular cam rotating in an elliptical slot in a yoke to achieve sine wave motion. For the usual reciprocating piston compressor/engine, with a crankshaft, crank, connecting rod, piston, and piston pin, it can be shown that the equation of motion of the piston in the cylinder is as follows: $y = a \sin \alpha + \sqrt{b^2 - o^2 \cos^2 \alpha}$, wherein y is the linear position of the piston about some median point, a is crank length (from the center of the crankshaft to the center of the crank pin joining the crack and the connecting rod), b is the connecting rod length (from the center of the crank pin to the center of the piston pin), and $\alpha$ is the angular position of the crankshaft. It can thus be seen that for unequal b and c, y is not a sine wave, and will depart more and more from such a wave as the ratio of b to c increases. For some cases, this may not be undesirable, but it is in a cryoegenic compressor. My invention, as set forth herein, is a device for converting rotary motion of a shaft to sine wave motion of piston or the like, or vice versa. The device might also be used, for example, to convert ocean wave motion to essentially constant rotational motion.

SUMMARY OF THE INVENTION

This invention is a device for converting constant angular rotation to sine wave reciprocating motion. It does this by using a crankshaft rotating at an essentially constant angular velocity. A connecting rod is attached at one end to a pin of a piston or other reciprocating object, and at the other end to a crank pin on the crank of the crankshaft. In order to achieve sine wave motion of the piston, the crank arm length is made equal to the connecting rod length.

BRIEF DESCRIPTION OF THE DRAWINGS

The single drawing sheet is a side partial sectional view of an embodiment of the invention.

DETAILED DESCRIPTION OF PREFERRED EMBODIMENT

The invention may be best understood when this disclosure is taken in conjunction with the drawing, in which reference numeral 10 generally designates the inventive device. The device includes upper block portion 11, crankshaft 12 with crank arms 12a and counterweight 12b, and crank pin 12c. Crankshaft 12 is supported by split bearings 13a-13b and 14a-14b, and includes flanges 12d to prevent longitudinal movement. Piston 15 in cylinder 16 carries piston pin 17. Connecting rod 18 connects crank pin 12c and piston pin 17 and is journaled to these pin by respective split bearing 19a-19b and press bearing 20. Bearing cap 21 bolts to rod 18 with bolts; the head of one such bolt is seen at numeral 22. Bearings 13b and 14b are restrained by lower block position 23 bolted to upper block portion 11 by bolts, with heads 24. The top of cylinder 16 has opening 25 which may be tapped or otherwise adapted to receive a fluid conduit. A pressure wave will be induced at 25 which is in the shape of a sine wave.

The reason for this sine wave is the particular relationship between the connecting and length and crank length. Specifically, the distance "b" between the center of the piston pin and the center of the crank pin is made equal to distance "a" between the center of the crankshaft and the center of the crank pin. This relationship is the heart of the invention. The piston movement, in accordance with the formula as set forth in the Background of the Invention, is thus: $y = 2a \sin \alpha$.

While I have specifically described my invention thus far as usable for producing a sine wave of pressure in a conduit, obviously the piston may be replaced with a crosshead in guides for imparting sine wave motion to some reciprocating device. In other words, the connecting rod is connected to a member free to reciprocally translate along a particular axis, but constrained from other motions. Although I have shown a block with upper and lower parts, the lower block portion may obviously be replaced by bearing caps and a pan. The pan (or lower block part) may contain the usual lubricating fluid for this type of reciprocating engine, or ball bearings may be used where possible.

I claim:
1. A device for converting constant angular velocity to sine wave reciprocating motion, including:
   a crankshaft with a central axis and with a crank arm normal to said axis, fixed to said crankshaft at a first end, and carrying a crank pin at a second end, wherein said crank pin has a central axis parallel to the central axis of said crankshaft;
   a member free to reciprocally translate along a particular axis, but constrained from other motions and including a connecting pin having a central axis parallel to said other axes;
   a connecting rod connected between said pins and having a length such that the distance between the crankshaft and crank pin axes is equal to the distance between the crankpin and connecting pin axes.

2. A compressor for providing a sine wave of pressure including:
   a cylinder with an outlet port;
   a piston in said cylinder with a pin fitted thereto, wherein said pin has a central axis;
   a connecting rod with first and second ends, with said first end journaled to said pin;

a crankshaft having a central axis of rotation parallel to said pin anxis and having a crank arm with first and second ends, the first end being carried affixed to said crankshaft;

a crank pin affixed to said second end of said crank arm and having a central axis parallel to said other axes, whereby said second end of said connecting rod and said crank pin are journaled together, and wherein the distance from said pin axis to said crank pin axis is equal to the distance from said crankshaft axis to said crank pin axis.

* * * * *